United States Patent [19]

Grauel

[11] 4,130,728

[45] Dec. 19, 1978

[54] COMBINED MOUNTING FOR THROUGH-THE-WALL VIEWER AND INTERCOM

[76] Inventor: Stephen L. Grauel, 907 W. Broadway, Ardmore, Okla. 73401

[21] Appl. No.: 889,789

[22] Filed: Mar. 23, 1978

[51] Int. Cl.² .......................... H04M 1/00; H04R 1/28
[52] U.S. Cl. ..................................... 179/1 H; 179/1 E
[58] Field of Search ................... 179/1 H, 1 HF, 1 E; 350/212, 243, 244, 252

[56] References Cited

U.S. PATENT DOCUMENTS 2,169,874  8/1939  Hardt ................................... 350/243
3,404,234  10/1968  Batt et al. ............................ 179/1 H Primary Examiner—Kathleen H. Claffy
Assistant Examiner—E. S. Kemeny

[57] ABSTRACT

Seeing and talking through a wall or closed door is conveniently provided by the combination of a one-way observation telescope projecting through the door and a pair of intercom units, one on each side of the door. Each intercom housing has a flange with a hole such that the units may be supported cooperatively by the telescope ends. Each housing may also have protruding tips against the door surface to prevent rotation of the housing.

3 Claims, 4 Drawing Figures

COMBINED MOUNTING FOR THROUGH-THE-WALL VIEWER AND INTERCOM

BACKGROUND OF THE INVENTION

1. Field of the Invention

The present invention relates to two-way audio communication systems for homes, apartments, or the like, and more particularly to panel-like housings containing such a circuit and maintained in place by a through the wall observation tube.

Through the wall two-way audio communicating systems are usually installed in dwellings at the time of construction, however, there is a need for some means for installation of such communicating systems which may be easily installed, in dwellings not previously equipped with such communicating systems. This invention provides such a means.

2. Description of the Prior Art

Prior patents generally relate to the installation of two-way audio communicating systems at the time of construction or for modifying such circuits to connect with a tape player or to conduct audio signals to any one of a plurality of stations remote from the entranceway.

This invention is distinctive over prior two-way audio communicating systems by providing a pair of panel-like housings which may be easily installed on opposite sides of a door, or the like, and held in place by a through the wall observation tube.

SUMMARY OF THE INVENTION

A pair of relatively small substantially panel-like hollow housings are disposed in aligned opposition on opposing vertical surfaces of a door, or the like. Each of the housings in provided with a flange projecting from one longitudinal end in the plane of its door contacting surface. These flanges are provided with cooperating aligned apertures in cooperative alignment with a hole to be drilled through the door. The door hole and housing flange apertures receive a through the wall one-way observation tube which maintains the panels in position. The inside housing contains a two-way audio communication circuit which is connected with a speaker/microphone mounted in the respective housing. A normally "off" control switch arm, mounted on the inside housing, is movable between talk and listen positions and an audio warning position. The outside housing contains a doorbell switch or button connected with a conventional doorbell or an audio signal contained by the housing.

The principal object is to provide a pair of panel-like housings containing a two-way audio communicating circuit for installation on a door, or the like, which is held in place by a through the wall one-way observation tube.

DESCRIPTION OF THE PREFERRED EMBODIMENT

Figure 1:
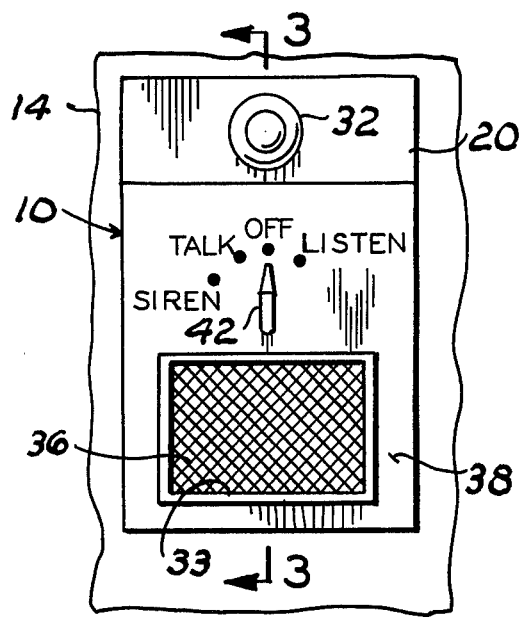
FIG. 1 is an elevational view of the inside housing mounted on the inside vertical surface of a fragment of a door.
Figure 2:
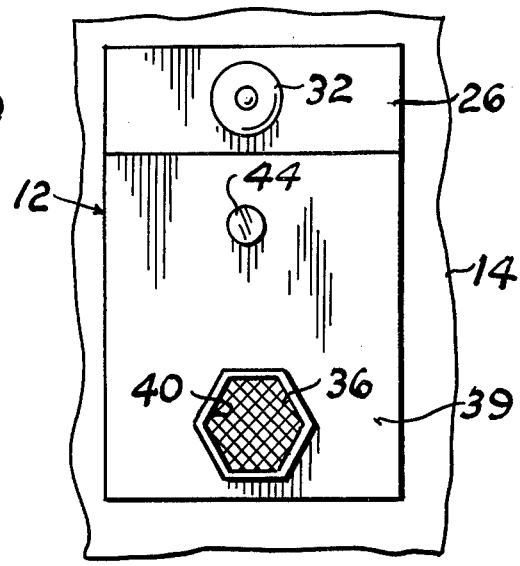
FIG. 2 is an elevational view of the outside housing mounted on the outside vertical surface side of a fragment of the door.
Figure 4:
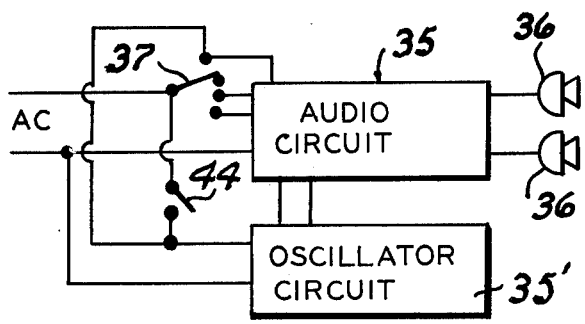
Figure 3:
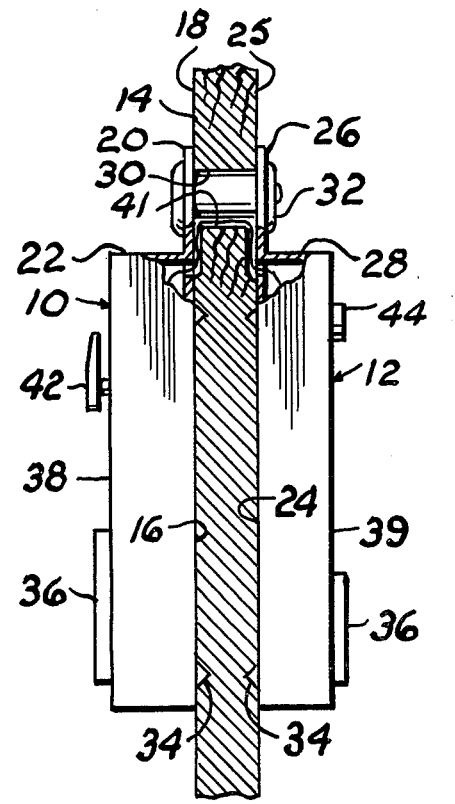
FIG. 3 is a vertical cross sectional view, partially in elevation, taken substantially alng the line 3—3 of FIG. 1; and, FIG. 4 is a simplified schematic diagram.

Like characters of reference designate like parts in those figures of the drawings in which they occur.

In the drawings:

The reference numerals 10 and 12 indicate a pair of generally rectangular hollow housings which are mounted in horizontally aligned relation on opposite vertical wall surfaces of a door 14. The back wall 16 of the housing 10 flatly contacts the inside vertical surface 18 of the door. The housing 18 includes a lip or flange portion 20 extending beyond its upper end 22 in the plane of its back wall 16. Similarly, the back wall 24 of the other or outside housing 12 contacts the outside vertical surface 25 of the door and is provided with an identical flange 26 projecting beyond the housing upper end 28 in the plane of the back wall 24. The two flanges 20 and 26 are centrally provided with line drilled apertures for the purposes presently explained.

At a selected elevation, the door is transversely drilled, as at 30, for receiving a conventional through the wall one-way viewing tube 32, such as disclosed by U.S. Pat. No. 2,638,810, having a wide angle concave negative lens at one end and a cooperating convex positive lens at its other end and sometimes referred to as a "cat's eye", which permits an occupant to view a visitor seeking entrance. The respective end portions of the viewing tube 32 also extend through the apertures in the flanges 20 and 26 for holding the housings in horizontally aligned relation on opposing sides of the door 14.

V-shaped plugs or tips 34 struck out from the material forming the back walls 16 and 24 of the housings enters the wooden material of the door to prevent rotation of the respective housing about the axis of the viewing tube 32.

The inside housing 10 contains a two-way audio communicating circuit 35, connected with a source of electrical energy, which includes an oscillator 35', a pair of speaker/microphones 36, disposed in the respective housings and a multiposition audio circuit control switch 37. The inside housing wall 38, opposite its back wall 16, is provided with an opening 33 for passage of audio waves to and from one of the speaker/microphones 36. Similarly, the outside housing wall 39, opposite its back wall 24, is provided with an opening 40 for the passage of audio waves to and from the other mircophone/speaker 36. The outside housing 12 also preferably contains an audible warning device, such as a siren, not shown. The circuit is connected to the microphone/speaker 36 and siren in the outside housing 12 by wiring extending through a groove 41 formed through the door and communicating with the door hole 30.

The inside housing 10 also includes a circuit control switch arm 42 rotatably mounted on its wall 38 and connected with the circuit control switch 37 which is normally in "off" position. The control switch arm 42 is movable by the occupant between listen, talk and audio warning positions.

The outside housing 12 is also provided with a conventional doorbell switch or button 44 connected by wiring, not shown, with the conventional doorbell, not shown, or a door signal contained by the inside housing 10.

OPERATION

In operation a visitor signals the dwelling occupant of his presence by pushing the doorbell button 44. The occupant views the visitor through the one-way observation tube 32, or if not visible to the occupant, turns the control switch arm 42 to the talk position and requests the visitor to move toward the central portion of the door. If the visitor is not known to the occupant, the occupant may communicate with the visitor by moving the control arm 42 from talk position to listen position after asking the visitor the purpose of his call. In the event the occupant deems it necessary he can call for assistance or alert others in the dwelling by moving the control switch arm 42 to alarm or siren position for energizing the oscillator circuit 35'.

Obviously the invention is susceptible to changes or alterations without defeating its practicability. Therefore, I do not wish to be confined to the preferred embodiment shown in the drawings and described herein.

I claim:

1. An improved through the wall audio visual communication apparatus for a door, or the like, having a one-way viewing tube extending therethrough, the improvement comprising:

a pair of hollow housings containing a two-way communication circuit including a pair of microphone/speakers; a circuit control switch in one of the housings; each housing having a back wall for flatly contacting opposing vertical wall surfaces of said door and each having a centrally apertured flange projecting beyond one end of the housing in the plane of the respective back wall for receiving respective end portions of said one-way tube and securing said housings to said door, each said housing having an opening in its wall opposite said back wall for the passage of audio waves to and from the microphone/speakers; and, a circuit control switch arm rotatably mounted on said one housing connected with the circuit control switch.

2. The combination according to claim 1 and further including:

a doorbell switch mounted on the second housing opposite said one housing.

3. The combination according to claim 2 and further including:

door surface penetrating tips struck out from the material forming said back wall of each said housing for preventing rotation of the respective housing about the axis of said one-way tube.

* * * * *